V. G. APPLE.
PHONOGRAPH MOTOR CONTROL.
APPLICATION FILED SEPT. 22, 1917.
1,316,552.
Patented Sept. 23, 1919.
2 SHEETS—SHEET 1.
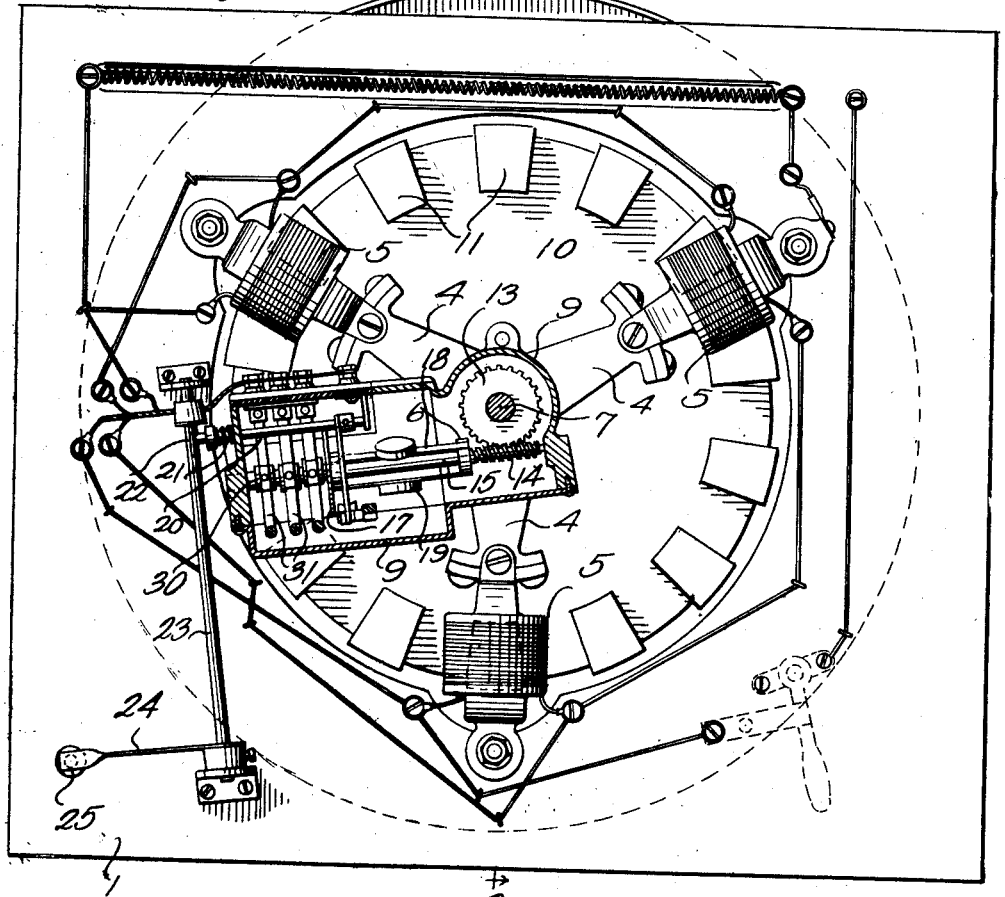
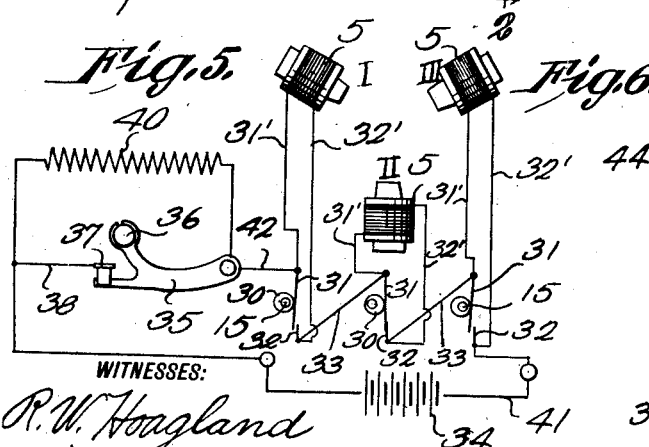
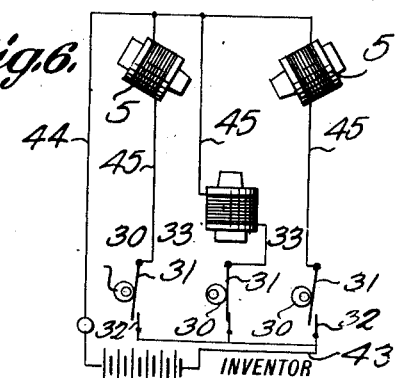
WITNESSES:
R. W. Hoagland
Ruth Parker
INVENTOR
Vincent G. Apple
BY
Walker
ATTORNEY

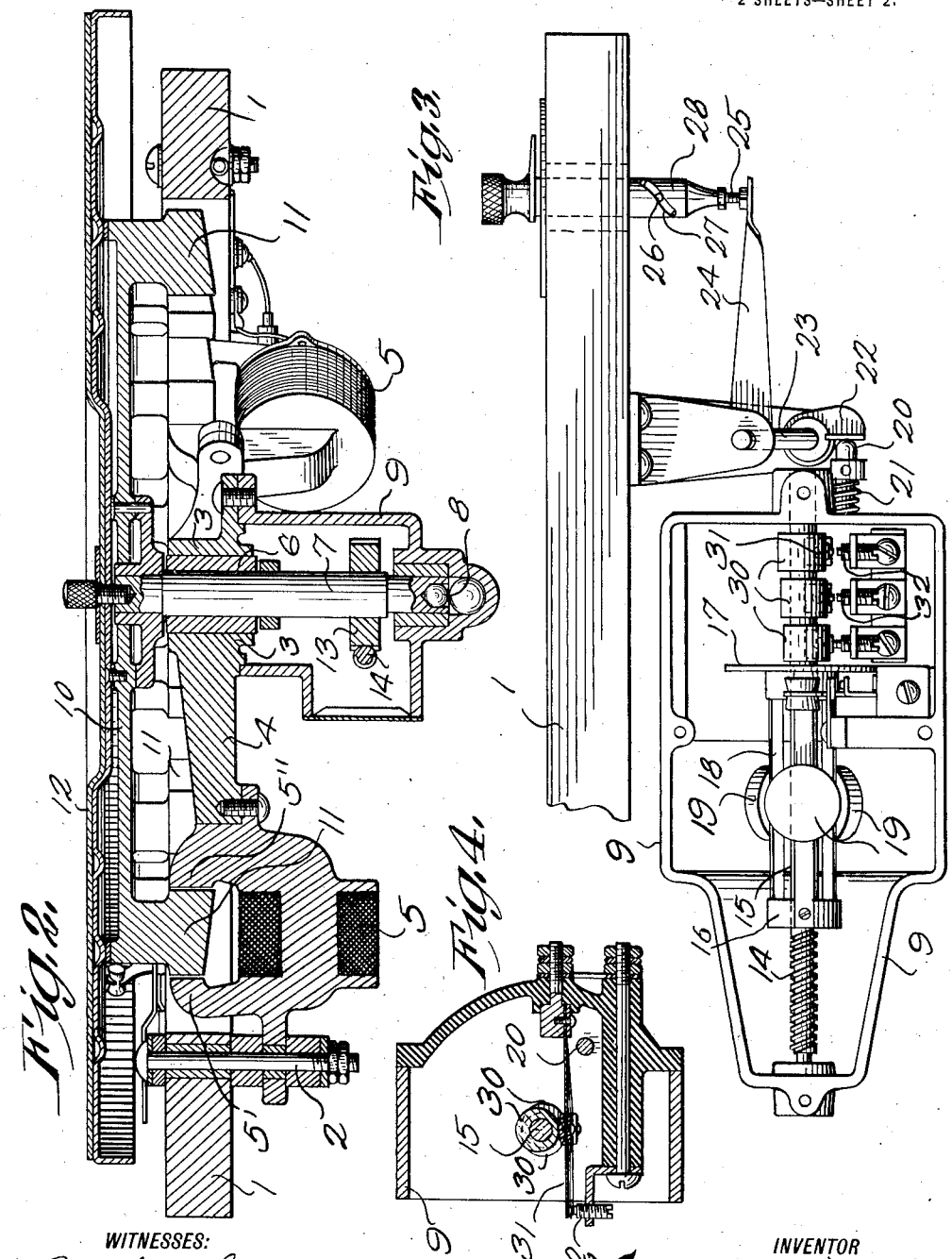

UNITED STATES PATENT OFFICE.

VINCENT G. APPLE, OF DAYTON, OHIO.

PHONOGRAPH-MOTOR CONTROL.

1,316,552.  Specification of Letters Patent. Patented Sept. 23, 1919.

Application filed September 22, 1917. Serial No. 192,772.

*To all whom it may concern:*

Be it known that I, VINCENT G. APPLE, a citizen of the United States, residing at Dayton, in the county of Montgomery and State of Ohio, have invented certain new and useful Improvements in Phonograph-Motor Controls, of which the following is a specification.

My invention relates to electric motors and more particularly to current controlling or circuit commuting means therefor. While the circuit commuting or current control means forming the subject matter hereof has been shown and described in conjunction with an electric motor of peculiar design, the construction and operation of which will form the subject matter of a separate application, it is to be understood that the present invention is not limited to this particular type or design of motor but may be employed in other associations or combinations.

The object of the invention is to improve the structure, as well as the means and mode of operation of such devices, whereby they will not only be cheapened in construction, but will be more efficient in use, positive in operation, automatic in action, uniform in effect and unlikely to get out of repair.

A further object of the invention is to provide improved circuit closing means for operating a plurality of circuit closers in predetermined sequence and to so time the closing of succeeding contacts of the sequence as to avoid arcing or sparking or affording other electrical resistance due to the intermittent making and breaking of contacts.

A further object of the invention is to so associate the circuit commuting means with the speed governing means as to establish a positive and uniform relation between said parts.

With the above primary and other incidental objects in view as will more fully appear in the specification, the invention consists of the features of construction, the parts and combinations thereof, and the mode of operation, or their equivalents, as hereinafter described and set forth in the claims.

Referring to the drawings, Figure 1 is a bottom plan view of a slow speed motor particularly adapted for phonograph operation or for driving other mechanism necessitating a comparatively slow but uniform speed, to which the present invention has been applied. Fig. 2 is a vertical sectional view of the assembled motor showing the same connected with the turntable of a phonograph. Fig. 3 is a detail side elevation of the current control or circuit commuting means by which the supply of current to the motor disclosed in Figs. 1 and 2 is regulated. Fig. 4 is a side elevation of the circuit closing or commuting means. Fig. 5 is a diagrammatic view of the electrical circuit involved in the construction shown in the preceding figures. Fig. 6 is a modification thereof.

Like parts are indicated by similar characters of reference throughout the several views.

In the drawings the present invention has been shown applied to a slow speed motor of special design particularly adapted for rotating the table or record support of a phonograph but which may obviously be applied to other purposes, for instance, the operation of mechanical advertising devices, the control of electric flash signs or signals, or the operation of special winding or material feeding apparatus.

Referring to the drawings, 1 is a stationary frame or support upon which is supported by bolts 2 a triad or spider comprising a central hub 3 and three radially disposed arms 4 projecting therefrom each of which arms carries at its outer end an electromagnet 5 of the horse shoe type, the poles 5' and 5'' of which are turned upward. The hub 3 of the spider or triad is provided with a bushing or bearing sleeve 6 to receive a vertical revoluble shaft 7 having a thrust bearing 8 in the lower extremity of a housing 9 supported upon the triad or spider. Secured to the upper end of the revoluble shaft 7 and rotating therewith is a rotor or revolving element of the motor construction comprising a disk 10 from which project a plurality of pendant spaced lugs 11 so positioned and proportioned as to successively pass between the upturned poles 5' and 5'' of the electromagnets 5 upon the rotation of said shaft and rotor. Mounted upon the shaft and rotor and revolving therewith is the table or record support 12, as shown in Fig. 2, when the device is employed as the actuating motor for a phonograph or similar construction. It will be understood that other operative devices or driving connections may be associated with the rotor for other purposes.

The lugs 11 which successively enter and pass through the field of the electromagnets 5 as the rotor revolves are so spaced as to bear different relation with the respective electromagnets 5. That is to say, when one lug is centrally disposed between the poles of one electromagnet, other lugs will be offset different degrees of relationship with the remaining electromagnets whereby a second lug will be entering the field of influence of a second electromagnet and the field of influence of the remaining electromagnet will be without a rotor lug therein. As shown in the drawings, the rotor is provided with fourteen pendant lugs which coact with three equally spaced electromagnets. It will be obvious that the relationship of three equal spacings to fourteen equal spacings will bring about the condition and relation before mentioned. While three electromagnets and fourteen equally spaced lugs have been adopted as a practical unit it will be understood that for different conditions of use, either more or less magnets or rotor lugs may be employed or the relationship of magnets and lugs as to numbers may be varied. It will be understood that the energizing of one of said electromagnets will cause the magnet to attract the lug nearest thereto, rotating the rotor until the dependent lug has assumed a central position in the field of said magnet which movement of the rotor will bring a second lug into the field of influence of another electromagnet whereupon the first acting magnet is excluded from the circuit or deënergized causing the second magnet to attract its neighboring lug which in turn moves the rotor to bring a third lug into the field of influence of the third electromagnet. The magnets are thus energized in sequence to cause a continual movement of the motor. For efficiency, the direction of the sequence in which the electro-magnets 5 are energized is preferably the reverse of the direction of rotation of the rotor. However, this is not essential.

The particular construction of the motor hereinbefore described forms no part of the present invention *per se* but will be described and claimed in a companion application, while the present invention pertains to the commuting or circuit changing devices by which the sequence and timing of the action of the electromagnets 5 is accurately predetermined.

To this end there is provided upon the shaft 7 a worm gear 13 meshing with a worm 14 upon an angularly disposed shaft 15 mounted in suitable bearings in a lateral extension of the housing 9. Upon the shaft 15 is mounted a centrifugal governor of the spring weight type comprising a collar 16 fixed upon said shaft and a friction or brake disk 17 loosely mounted thereon for sliding or lateral movement. The fixed collar 16 and laterally movable disk 17 are interconnected one with the other by longitudinally disposed flexible links or spring blades 18 each carrying in a medial position a weight 19. As the shaft 15 and attached governor parts rotate, the centrifugal tendency of the weights 19 tends to flex the flexible links or springs 18 outward thereby drawing the laterally movable disk 17 toward the fixed collar 16. A brake shoe carried upon a reciprocatory stem 20 and manually movable into frictional engagement with the disk 17 against the tension of a spring 21 determines the normal speed of the apparatus. This brake shoe or stem is controlled by means of a rock arm 22 mounted upon a rock shaft 23 carried in suitable bearings on the under side of the main frame 1. The rock shaft 23 carries a laterally disposed lever 24 the end of which projects beneath an adjusting stem 25 guided through a spiral or helical movement by means of a stud or pin 26 therein engaging in a spiral slot 27 in the bearing sleeve 28 through which the adjusting stem 25 operates.

Carried upon the shaft 15 adjacent to the governor mechanism before described is a plurality of eccentrics or cams 30 each of which is adapted to independently operate one of a series of circuit closers or contacts each of which comprises a spring arm 31 adapted upon depression to electrically engage a fixed contact 32. The supports of the electrical contact members are suitably insulated one from the other, as shown in detail in Fig. 4. There is provided a circuit closer or switch and an operating eccentric or cam therefor for each of the electromagnets 5. In the present instance there will of course be three circuit closers and three corresponding cams or eccentrics which are arranged in spaced equidistant relation about the shaft 15. Each cam or eccentric 30 as it rotates serves to depress the flexible arm or blade 31 of the circuit closer into engagement with the opposing contact member 32. The relation of the cams or eccentrics and the flexible contact blades or circuit closers is such that the contact between the elements 31 and 32 will be made before the cam or eccentric reaches its lowermost position and will therefore be maintained momentarily while the cam or eccentric passes its dead center and rises at the opposite side thereof. As shown in detail in Fig. 4 the relation is such that one circuit closer will be held in contact until the next closer of the sequence is operated. As the shaft 15 and cams or eccentrics carried thereby continue to rotate, one of said cams or eccentrics will release its operated circuit closer while the other maintains the circuit closing contact until the next succeeding cam or eccentric engages its corresponding circuit closer. There will thus be alternating intervals during which first two contacts or circuit closers will be closed and then one followed by two, etc., the alternation being maintained but the relative contacts being varied. For example, assuming that the first contact is made it will be maintained until contact No. 2 is closed and momentarily both contacts will be in closed condition, whereupon the first contact will be released and the second contact will be momentarily maintained alone until the third contact is made, whereupon the second and third contacts will be simultaneously maintained momentarily until the second contact is released, whereupon the third contact will alone be maintained until the first contact is again made, whereupon the first and third contacts will be maintained simultaneously until the second contact is reëstablished, this cycle of operations being maintained indefinitely. It will be noted that by this arrangement the circuit is maintained continuous.

As shown in the diagram of the wiring system, Fig. 5, the closing of the contact between the elements 31 and 32 pertaining to any particular electromagnet 5 does not bring that electromagnet into the main circuit as might be supposed, but to the contrary bridges the electromagnet or closes a shunt circuit which excludes the electromagnet from the main circuit. The electrical connections are preferably such that the several magnets 5 are normally included in series in said main circuit and the closing of a circuit closer pertaining to a magnet 5 forms a shunt around said magnet thereby deënergizing the shunted magnet.

Referring to the wiring diagram, Fig. 5 it will be noted that each electromagnet 5 is connected by lines 31' and 32' with the corresponding contact elements 31 and 32 of the circuit breaker pertaining to that magnet. The circuit closers are interconnected one with another by intermediate connections 33 extending from the contact 32 of the initial closer to the contact arm 31 of the second circuit closer and also from the contact 32 of the second closer to the contact arm 31 of the third circuit closer. The contact element 31 of the initial circuit closer is connected through battery 34 or through any other source of electrical energy with the contact element 32 of the third circuit closer or the last of the series. It will be understood that the series of electric magnets and circuit closers may be extended indefinitely. The arrangement is such that the closing of all of the circuit closers of the series will form a continuous circuit without passing through the magnets 5. However, in practical operation the closers are not all in contact at the same moment. It is to be further noted that each of the electromagnets 5 is bridged across the corresponding circuit closer whereby so long as the circuit closer is open the electromagnet is in the main circuit. There is shown at the left in Fig. 5 an automatic governing means under the control of the laterally movable governor disk 17 by which in the event of excessive speed, resistance is momentarily introduced into the circuit and again withdrawn upon the return of the ratio of speed to prescribed limits. To this end there is provided adjacent to the laterally movable disk 17 of the governor mechanism, an automatic brake arm 35 having thereon a contact head 36 of felt or some similar material to be engaged by the disk 17 upon its lateral movement under the influence of the centrifugal weights 19. The brake arm 35 is electrically connected with one contact element of the initial circuit closer of the series and in turn normally maintains a closed contact 37 with a contact element electrically connected through the line 38 with the source 34 of electrical energy. The line 38 if so desired may be grounded upon the frame of the apparatus as may also the line connecting with battery or other source of electrical energy 34. However, for convenience in following the circuits of the diagram this line has been shown continuous. Bridging the contact 37 made by the brake arm 35 is an electrical resistance element 40 whereby the circuit from the initial circuit closer is completed to the battery or source 34 of electrical energy through said resistance 40 when the contact 37 is opened. The arrangement is such that normally the current flows through the brake arm 35 and contact 37 to battery 34. However, upon excessive speed the lateral movement of the governor disk 17 shifts the brake arm 35 to open the contact 37, whereupon the current is shunted through the electrical resistance 40 until the speed of the apparatus decreases to such degree that the return of the governor disk 17 to normal relation permits the reëstablishment of the contact 37, whereupon the current passes direct to the battery or source 34 of electrical energy without passing through the resistance 40.

As shown in the diagram, the intermediate circuit closer of the series is shown in contact so that current passing from the battery or source 34 of electrical energy, through the line 41 to the contact elements 32 of the third or terminal circuit closer of the series which is shown open. The current then passes around said open circuit closer through the line 32' to the electromagnet III, then through the line 31' to the contact arm 31 which is electrically connected through the interconnection 33 with the element 32 of the intermediate circuit closer. This intermediate circuit closer is shown in contact and the current passes direct from element 32 to the element 31 without passing through the electromagnet II. Element 31 of the intermediate closer is electrically connected through the line 33 with the element 32 of the initial circuit closer. This circuit closer has been shown in the diagram as open, hence the current must pass through the line 32′ to the electromagnet I and thence through the line 31′ to the contact element 31, returning through the line 42, spring arm 35, contact 37 and line 38 to battery 34 in the event that the motor is operating at normal speed. In the event, however, that it is operating at excessive speed the current will pass through line 42, thence through the resistance 40 to the line 38 to the battery or other source of electrical energy 34. Upon the opening of the intermediate circuit closer of the series the electromagnet II will be returned to the circuit and upon the closing of the initial or terminal circuit closer the corresponding electromagnet will be excluded. By this arrangement the flow of current is uniformly maintained and the tendency to spark or arc upon the breaking of the circuit closers is avoided. There is also less interference or "kick-back" or disturbance of the magnetic action than when the electromagnets are brought into the circuit upon the closing and excluded upon the opening of the circuit breakers. However, such a system can be employed without material modification of the apparatus other than the modification of the wiring circuit. Such a circuit has been shown in Fig. 6. In this arrangement the several contact elements 32 are connected to the battery or source of electrical energy by a common line 43, while the opposite side of the battery or source of electrical energy is connected either through the spring arm 35 or the resistance 40 according to the condition of the governor, thence through the line 44 with the several electromagnets to which the line 44 is common. Each electromagnet is independently connected through lines 45 with the contact elements 31 of the corresponding circuit closers. The circuit closers are operated in the manner as before described but instead of excluding from the circuit the particular electromagnet pertaining to the circuit closer operated the closing of the contacts serves to bring such electromagnet into the circuit. Otherwise the operation is as before described.

The brake arm 35 carrying the friction pad 36 is so connected to the reciprocatory stem 20 that the adjustment of the latter varies the relation of the brake arm and friction pad in relation with the disk 17 of the governor mechanism whereby the said disk must move a greater or less distance before contacting the friction pad 36. The frictional resistance afforded by this pad 36 serves to retard the rotation of the governor disk 17 and thereby reduce the speed of the apparatus. At the same time the frictional engagement of said parts affords a dragging tendency by which the brake arm 35 is carried with the disk a limited distance serving to break the contact 37 thereby introducing resistance into the circuit as before described. As the speed of rotation decreases the disk 17 releases its pressure upon the friction pad 36 permitting the brake arm 35 to return to normal under the influence of a retracting spring 35′ thereby reëstablishing the contact 37.

From the above description it will be apparent that there is thus provided a device of the character described, possessing the particular features of advantage before enumerated as desirable but which obviously is susceptible of modification in its form, proportion, detail construction or arrangement of parts, without departing from the principle involved or sacrificing any of its advantages.

While in order to comply with the statutes, the invention has been described in language more or less specific as to certain structural features, it is to be understood that the invention is not limited to any specific details, but that the means and construction herein described comprise but one mode of putting the invention into effect, and the invention is therefore claimed broadly in any of its possible forms or modifications within the scope of the appended claims.

Having thus described my invention, I claim:—

1. The combination with a motor including a series of electromagnet windings, and an electric circuit in which the motor is included, of an independent circuit closer bridged across each winding, a cam shaft actuated by the motor, and a series of timing cams carried by said shaft adapted to operate said circuit closers in predetermined sequence whereby the closing of said circuit closers will exclude the associated winding from the circuit, and the opening thereof will energize said electromagnet windings.

2. The combination with a motor including a series of electromagnet windings, and an electric circuit in which the motor is included, of a series of movable contact members one for each winding, a governor controlling the operation of the motor, a governor shaft and circuit closing means carried on said shaft adapted to operate said movable contact members to energize said windings in predetermined succession.

3. The combination with a motor including a series of electromagnetic windings and an electric circuit in which the motor is included, of a series of independently movable circuit closers, one for each winding, and means actuated by the motor for independently opening the circuit closers to energize the windings in predetermined sequence.

4. The combination with a rotary table, an actuating motor therefor including a plurality of windings, and an electric circuit in which all the motor windings are connected in series, of a series of independently operated circuit closers one for each winding controlling the operation of the motor, and a series of rotary cams, one for each circuit closer operating in unison with the rotation of the table for independently actuating the circuit closers to shunt the associated windings out of said circuit.

5. In a construction of the character described, the combination with an electric motor including a plurality of windings connected in series, an electric circuit including a series of shunts one for each winding, a circuit closer in each shunt, a series of rotary cams one for each circuit closer, a speed governing device, and a shaft common to the speed governing device and the rotary cams whereby said cams are rotated to actuate the circuit closers to exclude the motor windings in predetermined sequence in unison with the operation of the speed governing device.

6. The combination with an actuating motor for a rotary table having a rotary shaft upon which the table is carried, an electric circuit in which said motor is included, of a series of normally open independently operated circuit closers controlling the operation of the motor, a shaft angularly disposed in relation with said table shaft, intermediate driving connections between said shafts and a series of rotary cams one for each circuit closer carried upon said angularly disposed shaft for independently operating said circuit closers in sequence by the rotation of said shaft.

7. The combination with an actuating motor for a rotary table including a rotary supporting shaft, an electric circuit in which said motor is included, of a series of normally open independently operated circuit closers controlling the operation of the motor, a shaft angularly disposed in relation with said table shaft, intermediate worm drive connections between said shafts, and a plurality of cams one for each circuit closer carried by said last mentioned shaft adapted to independently operate said circuit closers upon the rotation of the shaft and speed governing means mounted upon said cam shaft whereby the rotation of said cams will be automatically regulated by said speed governing means.

8. The combination with a motor including a plurality of electromagnet windings, and an electric circuit in which the electromagnet windings are normally included, of a normally open shunt connection bridging each electromagnet winding, a plurality of rotary cams, and a plurality of spring contact fingers engaged by said rotary cams for intermittently closing said shunt connections thereby excluding the winding pertaining thereto from the circuit.

9. The combination with a motor including a plurality of windings, an electric circuit in which said windings are normally connected in series, a plurality of shunt connections, a rotary cam shaft actuated by the motor, a plurality of cams carried thereby, and a series of circuit closers one controlled by each cam for automatically closing said shunt connections each independent of the other to exclude the particular windings pertaining thereto from the circuit.

10. The combination with a motor including a plurality of electromagnet windings, an electric circuit in which the windings are normally connected in series, a series of movable contact arms one for each winding, a rotary shaft actuated by said motor, and means carried by said shaft to independently actuate said contact arms for automatically excluding said windings from the circuit in predetermined sequence.

11. The combination with a motor including a plurality of electromagnet windings, an electric circuit in which the motor is included, and means for alternately connecting a single one of said windings and two of said windings simultaneously in said circuit.

12. The combination with a motor including a plurality of electromagnet windings, an electric circuit in which the windings are normally connected in series, and means for alternately excluding a single one of said windings and two of said windings simultaneously from said circuit.

13. The combination with an electric motor including a plurality of windings, and an electric circuit in which the motor is included, of independently operated circuit closers interconnected in series one with another, one of said windings being bridged across each circuit closer, a revoluble shaft, a series of cams carried thereby adapted by their rotation to automatically operate said circuit closers in predetermined sequence.

14. The combination with an electric motor including a rotor and a plurality of electromagnet windings arranged in circular formation controlling said motor, an electric circuit including said motor, said windings being connected one with another in series, a normally open shunt for each winding, a circuit closer in each of said shunts, and a series of rotary cams one for each circuit closer rotating in unison and adapted to permit the opening of the shunts in predetermined sequence for automatically energizing said windings in a sequence the direction of which is the reverse of the direction of rotation of the rotor.

15. In a construction of the character described, the combination with an electric motor, an electric circuit including the motor, electrical resistance in said circuit, a rotary speed governor, a normally closed shunt circuit bridging said resistance and an oscillatory switch arm in said shunt movable in a plane parallel with the plane of rotation of the speed governor and adapted to be opened by the frictional engagement of the governor therewith.

16. In a construction of the character described, the combination with an electric motor, an electric circuit including the motor, electrical resistance in said circuit, a speed governor, including a revoluble brake disk, a movable switch arm normally closing a shunt bridging said resistance, said disk and arm being relatively movable into and out of frictional engagement by the action of the governor, the tendency of the disk being to move the arm in unison therewith while frictionally engaged, and a contact opened in said shunt by the movement of the arm under the influence of the disk.

17. In a construction of the character described, the combination with an electric motor, an electric circuit including the motor, electrical resistance in said circuit, a speed governor including a brake disk, a shunt bridging the said resistance, a switch arm normally maintaining the shunt closed, means for relatively moving the disk and switch arm laterally, one independently of the other into and out of engagement, said arm and disk being capable of further radial movement in unison, and a contact in said shunt opened by the unison radial movement of the arm with the disk.

In testimony whereof, I have hereunto set my hand this 17th day of September, A. D. 1917.

VINCENT G. APPLE.

Witnesses:
E. V. MARTIN,
F. L. WALKER.